(12) United States Patent
Yokota

(10) Patent No.: US 9,114,936 B2
(45) Date of Patent: Aug. 25, 2015

(54) CONVEYOR APPARATUS

(75) Inventor: Yatsuharu Yokota, Hachioji (JP)

(73) Assignee: Yokota Technica Limited Company, Tokyo (JP)

( * ) Notice: Subject to any disclaimer, the term of this patent is extended or adjusted under 35 U.S.C. 154(b) by 0 days.

(21) Appl. No.: 14/241,450

(22) PCT Filed: Aug. 27, 2012

(86) PCT No.: PCT/JP2012/071622
§ 371 (c)(1),
(2), (4) Date: Apr. 29, 2014

(87) PCT Pub. No.: WO2013/031740
PCT Pub. Date: Mar. 7, 2013

(65) Prior Publication Data
US 2014/0231224 A1    Aug. 21, 2014

(30) Foreign Application Priority Data

Aug. 29, 2011    (JP) .................................. 2011-185695

(51) Int. Cl.
*B65G 29/00*    (2006.01)
*B65G 25/10*    (2006.01)
(Continued)

(52) U.S. Cl.
CPC ................ *B65G 25/10* (2013.01); *B23K 1/008* (2013.01); *B23K 1/0016* (2013.01); *B23K 3/047* (2013.01); *B23K 3/08* (2013.01); *B65B 25/08* (2013.01); *F27D 3/0025* (2013.01); *B23K 2201/42* (2013.01)

(58) Field of Classification Search
CPC ...... B65G 25/10; B65G 25/04; B65G 47/901; B65G 47/82
USPC ................... 198/468.9, 468.11, 717
See application file for complete search history.

(56) References Cited

U.S. PATENT DOCUMENTS 4,991,374 A * 2/1991 Rademacher et al. ... 198/468.11
5,320,213 A * 6/1994 McIntosh et al. .......... 198/468.9
(Continued)

FOREIGN PATENT DOCUMENTS

JP    S63-154524    10/1988
JP    06-063733     3/1994
(Continued)

OTHER PUBLICATIONS

International Search Report issued in corresponding International Patent Application No. PCT/JP2012/071622 dated Nov. 13, 2012 (6 pages).

*Primary Examiner* — James R Bidwell
(74) *Attorney, Agent, or Firm* — Kilyk & Bowersox, P.L.L.C.

(57) ABSTRACT

A conveyor apparatus includes a pusher piece (19) fixed to a conveying rod (18) adapted to reciprocate along a board conveyance path, and a switching mechanism adapted to switch the pushing piece, by turning the conveying rod a predetermined angle, between an engaged position where the pusher piece (19) engages with a rear end face of a board (7) and a retracted position where the pusher piece (19) does not interfere with the board (7). The switching mechanism includes a guide member (23) provided with a guide hole (24) adapted to guide a guide rod (22). The guide hole (24) is made up of first and second guide holes (25 and 26) configured to extend in parallel to each other in a conveyance direction and slanted coupling guide holes (27, 27) adapted to couple ends of the first and second guide holes (25 and 26). When the conveying rod (18) reciprocates, the guide rod (22) makes a round of the closed-loop guide hole (24). When the guide rod (22) is guided by the first guide hole (25), the pusher piece (19) is positioned at the engaged position. When the guide rod (22) moves from the first guide hole (25) to the second guide hole (26), the conveying rod (18) axially rotates a predetermined angle, thereby positioning the pusher piece (19) at the retracted position.

6 Claims, 5 Drawing Sheets

(51) Int. Cl.
*B65B 25/08* (2006.01)
*F27D 3/00* (2006.01)
*B23K 3/08* (2006.01)
*B23K 1/00* (2006.01)
*B23K 1/008* (2006.01)
*B23K 3/047* (2006.01)

(56) References Cited

U.S. PATENT DOCUMENTS

| | | | | |
|---|---|---|---|---|
| 5,915,916 | A * | 6/1999 | Saji | 198/468.9 |
| 6,488,078 | B2 * | 12/2002 | Beutler et al. | 165/133 |
| 6,600,137 | B1 | 7/2003 | Nonomura et al. | |
| 7,097,023 | B1 * | 8/2006 | Chen | 198/466.1 |
| 8,028,818 | B2 * | 10/2011 | Kupetz et al. | 198/468.9 |
| 2003/0183485 | A1 * | 10/2003 | Zeibig et al. | 198/468.9 |
| 2003/0205445 | A1 * | 11/2003 | Kuwabara | 198/468.9 |
| 2014/0231223 | A1 | 8/2014 | Yokota | |

FOREIGN PATENT DOCUMENTS

| | | |
|---|---|---|
| JP | 06-226484 | 8/1994 |
| JP | 06-336351 | 12/1994 |
| JP | 11-040941 | 2/1999 |
| JP | 2002-361472 | 12/2002 |

* cited by examiner

CONVEYOR APPARATUS

The present application is a National Stage Application of PCT/JP2012/071622, filed Aug. 27, 2012, which claims priority from Japanese Patent Application No. 2011-185695, filed Aug. 29, 2011.

FIELD OF THE INVENTION

The present invention relates to a conveyor apparatus, which, for example, is effectively used for a reflow soldering apparatus provided with a decompression process for degassing a soldered portion during soldering.

BACKGROUND OF THE INVENTION

The reflow soldering apparatus solders, for example, a printed circuit board on which electronic components have been mounted using cream solder, solder paste, or the like while conveying the board on a conveyor, inside a furnace having a preheating process, a reflow process, and a cooling process in sequence (See Patent Document 1).

Patent Document 2 discloses a method for conveying a board in a reflow furnace. A conveyor system disclosed in Patent Document 2 includes a main endless conveyor belt configured to extend from an inlet to an outlet of a reflow furnace and operated at a constant speed. A board conveyance path is formed to convey boards from the inlet to the outlet of the reflow furnace on the main endless conveyor belt. On the board conveyance path, plural pushers are placed, being spaced away from each other in a workpiece conveyance direction, and each of the pushers reciprocates in directions the same as and opposite to the workpiece conveyance direction. The pusher can push the board on the main endless conveyor belt upward and convey the board in the workpiece conveyance direction at a controlled speed. An endless belt has been adopted to reciprocate the pushers attached to the endless belt. When the endless belt rotates in a forward direction, the pusher moves in the workpiece conveyance direction, and when the endless belt rotates in a reverse direction, the pusher moves in the direction opposite to the workpiece conveyance direction.

A first pushers included in the plural pushers is used to send a board into a reflow process of the reflow furnace. A second pushers are used to send the board out of the reflow process and convey the board from the reflow process to a cooling process. The first and second pushers are controlled to move independently of the main endless conveyor belt at a speed faster than the main endless conveyor belt.

In soldering using a reflow furnace, preferably a degassing process is applied in advance to avoid foaming in accompanying with heating. For example, in the reflow soldering apparatus shown in Patent Document 1, when a decompression chamber capable of reducing ambient pressure is installed on a board conveyance path such that a soldered portion formed on the board and molten by heating will be degassed in the decompression chamber, a single conveyor (main endless conveyor belt) cannot be installed over the entire board conveyance path including the decompression chamber because the decompression chamber needs to be enclosed hermetically during decompression. Therefore, separate conveyors are installed in the decompression chamber and in conveyance paths in processes preceding and succeeding the decompression chamber. In this case, if a conveyor is installed in the decompression chamber, there is a problem in that mechanical components of the conveyor become expensive to withstand a decompressed atmosphere and that maintenance frequency is increased.

With the board conveyance method described in Patent Document 2, air cylinders are used to move the pushers up and down, resulting in increased maintenance frequency. Also, the air cylinders themselves need to be moved in the conveyance direction.

Patent Document 1
    Japanese Patent Laid-Open No. 2000-188467
Patent Document 2
    Japanese Patent Laid-Open No. 11-40941

SUMMARY OF THE INVENTION

An object of the present invention is to provide a conveyor apparatus capable of carrying a workpiece in and out of a desired process.

A further object of the present invention is to provide a conveyor apparatus which lends itself to easy maintenance as well.

A conveyor apparatus according to the present invention comprises: a conveying rod adapted to reciprocate along a conveyance path along which a workpiece is conveyed; a pusher member fixed to the conveying rod and configured to protrude from the conveying rod; and a switching mechanism adapted to switch the pusher member, by turning the conveying rod a predetermined angle, between an engaged position where the pusher member engages with the workpiece and a retracted position where the pusher member is separated from the workpiece.

The conveyor apparatus according to the present invention allows a workpiece to be carried in and out of a desired process and lends itself to easy maintenance as well. The conveyor apparatus according to the present invention is suitably applied to a reflow furnace.

According to a preferred embodiment of the present invention, the switching mechanism includes a guide member related to the conveying rod; the conveying rod includes a guided portion protruding from the conveying rod; the guide member includes a guiding portion adapted to guide the guided portion of the conveying rod; the guiding portion is configured to guide the guided portion into a closed loop using first and second guiding portions configured to extend in parallel to each other along the conveyance path and first and second coupling guide portions configured to couple ends of the first and second guiding portions to each other; the guide member is configured such that the guided portion makes a round of a guiding portion of the closed loop of the guide member through one reciprocating motion of the conveying rod; the pusher member of the conveying rod assumes the engaged position when the guided portion of the conveying rod moves forward by being guided by the first guiding portion; and the pusher member of the conveying rod assumes the retracted position when the guided portion of the conveying rod moves backward by being guided by the second guiding portion.

BRIEF DESCRIPTION OF THE DRAWINGS

FIG. 4(a) shows a guide member on the right side as viewed from an outlet side to an inlet side of a furnace while FIG. 4(b) shows a guide member on the left side;

DESCRIPTION OF SYMBOLS

1 . . . Furnace; 2A, 2B . . . Preheating chamber; 3A, 3B . . . Reflow chamber; 4 . . . Cooling chamber; 5 . . . Decompression chamber; 5A . . . Upper housing; 5B . . . Lower housing; 6 . . . Partition wall; 7 . . . Printed board with electronic components mounted thereon; 8, 9, 10 . . . Board conveyance rail; 11 . . . Inlet; 12 . . . Outlet; 13 . . . Conveyor apparatus; 13A . . . First conveyance mechanism; 13B . . . Second conveyance mechanism; 14, 15, 16 . . . Heater; 17 . . . Cooling device; 18 . . . First conveying rod; 19 . . . Pusher piece; 20 . . . Rod support member; 20a . . . Rod bearing hole; 20b . . . Guiding portion; 21 . . . Support wall; 21a . . . Guide groove; 22 . . . Guide rod; 23 . . . Guide member; 23a . . . Guide member body; 24 . . . Guide hole; 25 . . . First guide hole; 26 . . . Second guide hole; 27 . . . Coupling guide hole; 28 . . . Blocking piece; 29 . . . Pivot pin; 30 . . . Linking piece; 31 . . . Return spring; 32 . . . Second conveying rod; 33 . . . Upright member; 34 . . . Coupling rod; 35 . . . Chain conveyor; 36 . . . Coupling rod

DETAILED DESCRIPTION OF THE INVENTION

A preferred embodiment of the present invention will be described below with reference to the accompanying drawings.

Figure 1:
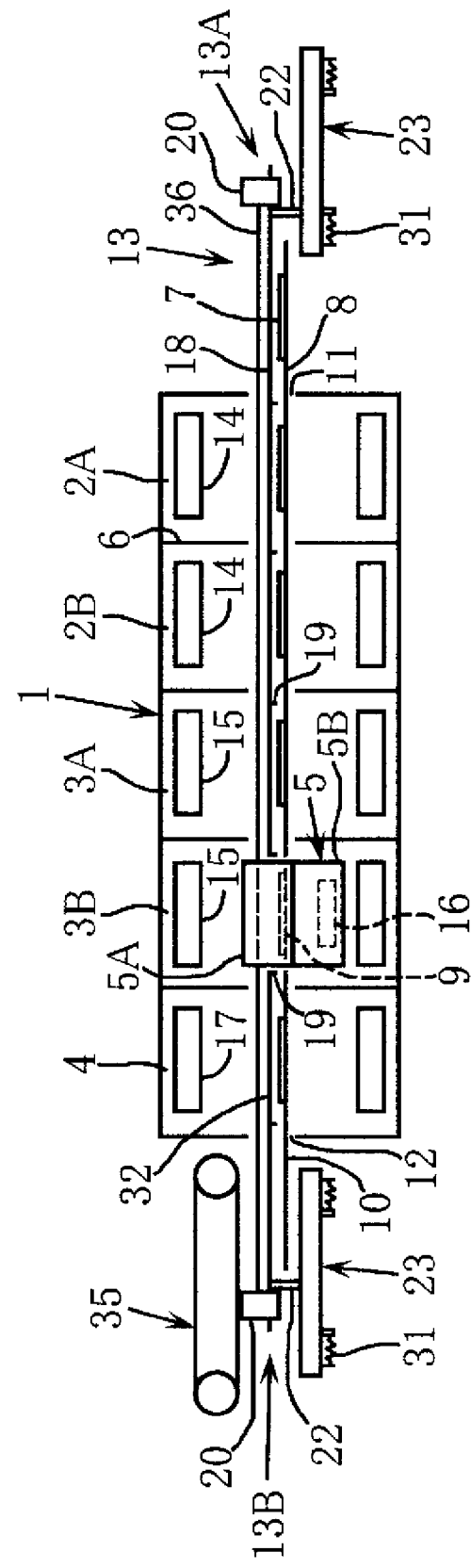
FIG. 1 is an overall configuration diagram showing a reflow soldering apparatus equipped with a conveyor apparatus according to an embodiment of the present invention.

Overall Configuration of Reflow Furnace:

As shown in FIG. 1, a reflow soldering apparatus (reflow furnace) includes plural chambers partitioned in a workpiece conveyance direction and lined up in series within the furnace 1. Specifically, the reflow furnace 1 includes, in order in the workpiece conveyance direction: two preheating chambers 2A and 2B located on the right side of the drawing, two reflow chambers 3A and 3B located in the center of the drawing, and one cooling chamber 4 located on the left side of the drawing. Furthermore the reflow furnace 1 includes a decompression chamber 5 in the reflow chamber 3B. Reference number 6 denotes a partition wall adapted to partition adjacent chambers. An inert gas—nitrogen gas according to the present embodiment—is supplied as an ambient gas into the reflow furnace 1 to prevent oxidation of solder.

A printed circuit board (hereinafter referred to simply as a "board") 7 with electronic components mounted thereon is conveyed on conveyance rails laid linearly in the reflow furnace 1. The conveyance rails are made up of three pairs of rails 8, 9, and 10 which are arranged in series in the workpiece conveyance direction, forming a pair of linear workpiece conveyance paths by being placed in a same horizontal plane in the reflow furnace 1. The first conveyance rails 8 are disposed horizontally from a position in front of an inlet 11 of the furnace 1 to an inlet of the decompression chamber 5 in the furnace 1. The second conveyance rails 9 are disposed horizontally in the decompression chamber 5. The third conveyance rails 10 are disposed horizontally from an outlet of the decompression chamber 5 to an outlet 12 of the furnace 1. The rails in each of the conveyance rail pairs 8, 9, and 10 are installed on right and left sides of the conveyance path of the board 7, supporting right and left edges of a bottom face of the board 7.

Cream solder has been applied to soldering locations on a top face of the board 7 which is input to the reflow furnace 1 and electronic components have been put on the cream solder. The board 7 with electronic components placed thereon via the cream solder are moved along the conveyance rails 8, 9, and 10 by the conveyor apparatus 13.

That is, the board 7 is conveyed intermittently by the conveyor apparatus 13 from a position in front of the inlet 11 of the furnace 1. First, the board 7 is sent to the first preheating chamber 2A and heated there in a first preheating process for a predetermined period of time in an ambient gas heated by a heater 14. Next, the board 7 is sent to the adjacent preheating chamber 2B next by the conveyor apparatus 13 and heated there in a preheating process for a predetermined period of time in an ambient gas heated by a heater 14. Next, the board 7 is sent to the first-stage reflow chamber 3A by the conveyor apparatus 13, and a soldered portion is molten by being heated there in a reflow process for a predetermined period of time in an ambient gas heated by a heater 15.

The decompression chamber 5 in the second-stage reflow chamber 3B is divided horizontally into an upper housing 5A and lower housing 5B, and the lower housing 5B is fixedly placed in the reflow chamber 3B. In contrast, the upper housing 5A is configured to be able to move up and down by means of an actuator—specifically, a cylinder device (not shown)—and able to assume two states: a tightly closed state (see FIG. 1) in which the upper housing 5A is placed in close contact with the lower housing 5B by moving down and an open state (not shown) in which the upper housing 5A is placed above and spaced away from the lower housing 5B by moving up.

Thus, the board 7 is carried into the decompression chamber 5 in the reflow chamber 3B from the reflow chamber 3A by the conveyor apparatus 13, in open state in which the upper housing 5A of the decompression chamber 5 is placed above and spaced away from the lower housing 5B. On the other hand, the tightly closed state is achieved in a decompression process in which the decompression chamber 5 is depressurized to degas the cream solder on the board 7. In the decompression process, the soldered portion is heated and degassed for a predetermined period of time. That is, the soldered portion on the board 7 is heated and molten in an ambient gas heated by a heater 16, the decompression chamber 5 is subsequently put in the tightly closed state and depressurized by a vacuum pump (not shown) to a predetermined decompressed atmosphere in which the soldered portion is degassed, and the molten soldered portion on the board 7 is degassed in the predetermined decompressed atmosphere.

Subsequently, the decompression chamber 5 is put in the open state, the board 7 is sent by the conveyor apparatus 13 to the cooling chamber 4 through the reflow chamber 3B heated by the heater 15, and the soldered portion solidifies in the cooling process there by being cooled by a cooling device 17 for a predetermined period of time. Then, the board 7 is carried outside from the cooling chamber 4 through the outlet 12 of the furnace 1 by the conveyor apparatus 13.

Conveyor Apparatus 13:

Next, the conveyor apparatus 13 will be described below. The conveyor apparatus 13 includes a first conveyance mechanism 13A and second conveyance mechanism 13B.

Figure 3:
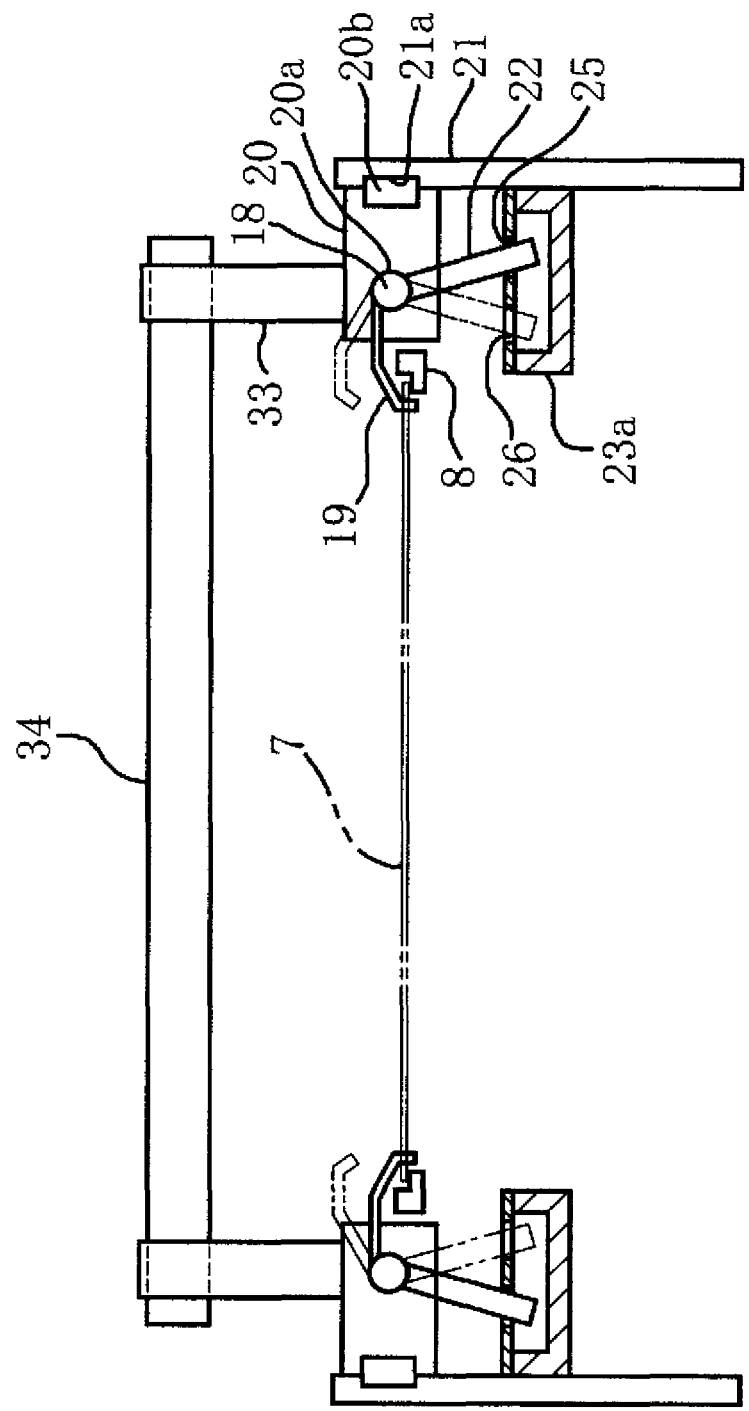
FIG. 3 is a sectional view showing the conveyor apparatus.

First, the first conveyance mechanism 13A will be described. The first conveyance mechanism 13A includes first conveying rods 18 (FIGS. 1 and 3). The first conveying rods 18 are placed horizontally along the first conveyance rails 8, extending in the furnace 1 from a position in front of the inlet 11 of the furnace 1 to a position in front of the decompression chamber 5 (FIG. 3). Four pusher pieces 19 are positioned at intervals on the first conveying rod 18. The left and right pusher pieces 19 are fixedly attached to the respective first conveying rods 18. As described later, as the first conveying rod 18 is axially rotated, each pusher piece 19 can assume an engaged position (position indicated by a solid line in FIG. 3) where the pusher piece 19 abuts the board 7 and a retracted position (position indicated by a virtual line in FIG. 3) spaced away from the board 7.

An end of each first conveying rod 18 on the side of the furnace inlet 11 is inserted in a bearing hole 20a of a rod support member 20. The first conveying rod 18 is supported by the rod support member 20 axially rotatably, but immovably in an axial direction. The rod support member 20 has a guiding portion 20b on an outer surface. A support wall 21 is elected on an outer side of the rod support member 20. The guiding portion 20b of the rod support member 20 is engaged with horizontal guide groove 21a formed in an inner surface of the support wall 21. The rod support member 20 is configured to be able to move horizontally by being guided by the guide groove 21a provided with one end and another end. Thus, the first conveying rod 18 can move horizontally in the furnace 1 in a conveyance direction of the board 7 along with the rod support member 20.

When the first conveying rod 18 advances from the side of the inlet 11 of the furnace 1 to the side of the outlet 12 (hereinafter referred to as "forward movement"), the pusher piece 19 (see FIG. 3) is positioned at a place (engaged position) where the pusher piece 19 engages with a rear face of the board 7 on the conveyance rails 8, and when the first conveying rod 18 advances from the side of the outlet 12 of the furnace 1 to the side of the inlet 11 (hereinafter referred to as "backward movement"), the pusher piece 19 is positioned at a place (retracted position) retracted to above the board 7. The pusher piece 19 is switched between the engaged position and the retracted position by axially rotating the first conveying rod 18 a predetermined angle.

Switching Mechanism for Switching Pusher Piece 19 Between Engaged Position and Retracted Position:

The switching mechanism includes a guide rod 22 (see FIGS. 1 and 3) fixed in position to an end (front end) of the first conveying rod 18 on the side of the furnace inlet 11. The guide rod 22 extends downward from the first conveying rod 18. The switching mechanism includes a guide member 23 (see FIGS. 1 and 3 to 5) placed in connection with the guide rod 22 and placed below the guide rod 22. The guide member 23 has a body 23a which is a box-shaped member, and a guide hole 24 is formed in a top face of the box-shaped body 23a. The guide rod 22 protruding from the first conveying rod 18 has its lower end inserted in the guide hole 24.

Figure 4:
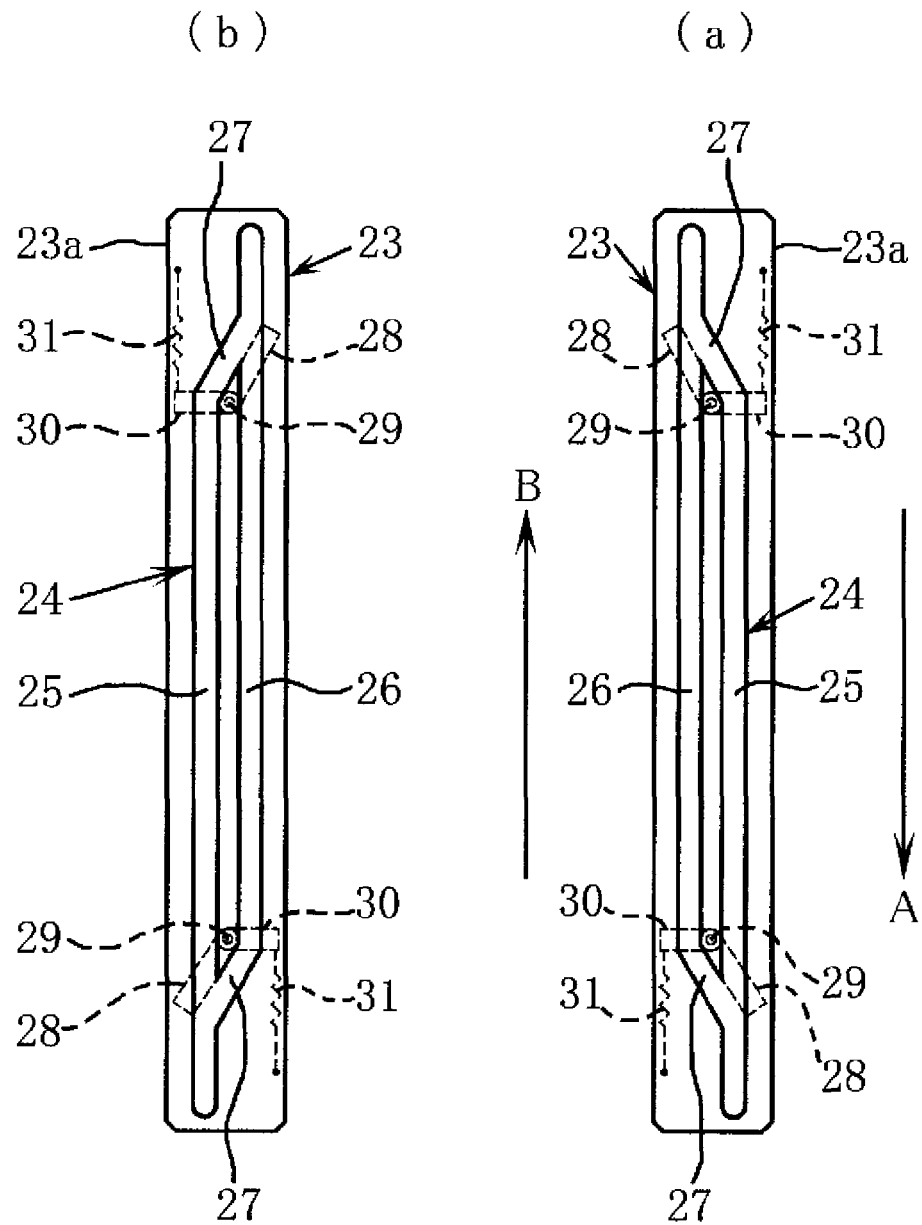
FIGS. 4(a) and 4(b) are plan views showing guide members, where

FIGS. 4(a) and 4(b) are plan views showing the guide members 23, where FIG. 4(a) shows the guide member on the right side as viewed from the outlet side to the inlet side of the furnace while FIG. 4(b) shows the guide member on the left side. Referring to FIG. 4, the guide hole 24 includes a first guide hole 25 adapted to place the pusher piece 19 of the first conveying rod 18 at the engaged position, a second guide hole 26 adapted to place the pusher piece 19 at the retracted position, and a coupling guide hole 27 adapted to couple the two guide holes 25 and 26. The first guide hole 25 and second guide hole 26 extend linearly along the conveyance direction of the board 7. Also, the first and second guide holes 25 and 26 extend in parallel to each other by being spaced away from each other. Also, the first and second guide holes 25 and 26 are joined together at both ends, i.e., at a front end and rear end in the workpiece conveyance direction via the coupling guide holes 27 described above.

Continuing to refer to FIG. 4, the rear end (end in upper part of FIG. 4) of the first guide hole 25 is coupled to the rear end (end in upper part FIG. 4) of the second guide hole 26 via a slant coupling guide hole 27 extending linearly in a diagonal direction. On the other hand, a front end portion (end in lower part of FIG. 4) of the first guide hole 25 is coupled to the front end (end in lower part of FIG. 4) of the second guide hole 26 via another slant coupling guide hole 27 extending linearly in a diagonal direction. In this way, the ends of the first and second guide holes 25 and 26 are coupled to each other via the coupling guide holes 27, forming the closed-loop guide hole 24, which in conjunction with the guide rod 22 inserted into the guide hole 24, makes up a cam mechanism adapted to swing the pusher piece 19 between the engaged position and the retracted position.

As described above, the pusher piece 19 assumes an engaged position and retracted position. The first guide hole 25 is a cam groove adapted to place the pusher piece 19 at the engaged position. The board 7 located on rails has its rear end engaged with the pusher piece 19, and when the first conveying rod 18 moves forward, the board 7 is pushed by the pusher piece 19 and thereby conveyed from one processing position to another processing position. When the conveyance is finished, the first conveying rod 18 moves backward and returns to its original position. When the first conveying rod 18 moves backward, the pusher piece 19 is positioned at the retracted position.

When the guide rod 22 is located in the first guide hole 25, the pusher piece 19 assumes the engaged position. On the other hand, when the guide rod 22 is located in the second guide hole 26, the pusher piece 19 assumes the retracted position. Therefore, with the first conveying rod 18, when the guide rod 22 moves forward by being guided by the first guide hole 25 (direction of arrow A in FIG. 4), the pusher piece 19 is positioned at the engaged position (see FIG. 3) and moves the board 7 forward by pushing the rear face of the board 7. On the other hand, with the first conveying rod 18, when the guide rod 22 moves backward by being guided by the second guide hole 26 (direction of arrow B in FIG. 4), the pusher piece 19 is positioned at the retracted position (see FIG. 3) above the board 7 so as not to interfere with the board 7.

The following means is provided such that the guide rod 22 will move forward by being guided by the first guide hole 25 during forward movement of the first conveying rod 18 and move backward by being guided by the second guide hole 26 during backward movement of the first conveying rod 18.

Figure 5:
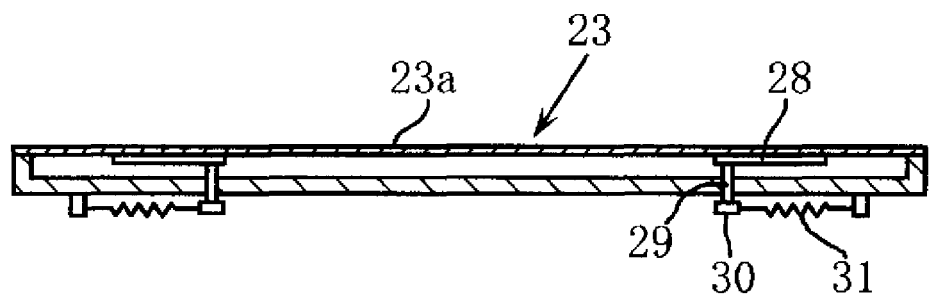
FIG. 5 is a longitudinal section view showing a guide member.

As shown in FIGS. 4 and 5, on a back face in upper part of the body 23a (FIG. 5) of the guide member 23, blocking pieces 28 are placed at opposite ends of the closed-loop guide hole 24. One of the blocking pieces 28 is placed, intersecting the first guide hole 25 while the other blocking piece 28 is placed, intersecting the second guide hole 26. Each of the blocking pieces 28 is fixed at one end to a pivot pin 29. The pivot pin 29 is turnably installed between the first guide hole 25 and second guide hole 26, perpendicularly penetrating the body 23a of the guide member 23. A linking piece 30 is placed on a bottom face in lower part of the body 23a of the guide member 23. The linking piece 30 is fixed at one end to a lower end of the pivot pin 29 and fixed at the other end to one end of a return spring 31 made up of a tension spring. The return spring 31 is fixed at the other end to the lower part of the body 23a of the guide member 23.

As described above, the blocking piece 28 coupled with the linking piece 30 via the pivot pin 29 is located at such a height position as to interfere with the guide rod 22 while the linking piece 30 is located at such a height position as not to interfere with the guide rod 22.

Therefore, during forward movement of the first conveying rod 18, as the guide rod 22 moves forward and advances to the front end of the first guide hole 25 by being guided by the first guide hole 25, the guide rod 22 comes into contact with the first blocking piece 28 illustrated in lower part of FIG. 4. As the guide rod 22 further moves forward, the first blocking piece 28 turns against the spring force of the return spring 31. Then, the guide rod 22 reaches the front end (end in lower part of FIG. 4) of the first guide hole 25. When the guide rod 22 passes the first blocking piece 28, the blocking piece 28 is returned to its original position by the return spring 31. In a forward movement process of the first conveying rod 18, i.e., in the process of advancing to the bottom end illustrated in FIG. 4 by being guided by the first guide hole 25, the pusher piece 19 is located at the engaged position (see FIG. 3) as described above. Therefore, the pusher piece 19 engages with the board 7 and pushes the board 7 one process forward to an adjacent, next process (e.g., from the reflow process to the decompression process).

Next during backward movement of the first conveying rod 18, as the guide rod 22 moves backward from the front end of the first guide hole 25 (moves upward from the lower end of the first guide hole 25 illustrated in FIG. 4) by being guided by the first guide hole 25, the guide rod 22 collides with the blocking piece 28 located across the first guide hole 25. As can be seen well from FIG. 4, the blocking piece 28 diagonally crosses the first guide hole 25. Preferably, the blocking piece 28 has an inclination angle equal to that of the coupling guide hole 27. In FIG. 4, when the guide rod 22 collides with the blocking piece 28 by moving upward from the lower end of the first guide hole 25, the guide rod 22 enters the slant coupling guide hole 27 by being guided by the slanted lateral edge of the blocking piece 28 and moves to the second guide hole 26 by passing through the coupling guide hole 27.

With the first conveying rod 18, when the guide rod 22 moves backward by being guided by the second guide hole 26, the guide rod 22 comes into contact with the second blocking piece 28 illustrated in upper part of FIG. 4. As the guide rod 22 further moves backward, the second blocking piece 28 turns against the spring force of the return spring 31 illustrated in the upper part of FIG. 4. Then, the guide rod 22 reaches an end of the second guide hole 26 (upper end of the second guide hole 26 in FIG. 4). When the guide rod 22 passes the second blocking piece 28, the blocking piece 28 is returned to its original position by the return spring 31. In a backward movement process of the first conveying rod 18, i.e., in a process in which the first conveying rod 18 moves backward by being guided by the second guide hole 26, the pusher piece 19 is located at the retracted position (see FIG. 3) as described above. Therefore, being positioned at the retracted position above the board 7 so as not to interfere with the board 7, the pusher piece 19 moves one process backward.

Next, with the first conveying rod 18, when the guide rod 22 moves forward by being guided by the second guide hole 26, (moves downward from the upper end of the second guide hole 26 in FIG. 4), the guide rod 22 collides with the blocking piece 28 located across the second guide hole 26. As can be seen well from FIG. 4, the blocking piece 28 illustrated in upper part of FIG. 4 diagonally crosses the second guide hole 26. Preferably, the blocking piece 28 has an inclination angle equal to that of the coupling guide hole 27. In FIG. 4, when the guide rod 22 collides with the blocking piece 28 by moving downward from the upper end of the second guide hole 26, the guide rod 22 enters the slant coupling guide hole 27 by being guided by the slanted lateral edge of the blocking piece 28 and moves to the first guide hole 25 by passing through the coupling guide hole 27. That is, the guide rod 22 enters the coupling guide hole 27 by being guided by the blocking piece 28 having the lateral edge slanted in the traveling direction of the guide rod 22. The coupling guide hole 27 is slanted in the traveling direction of the guide rod 22, and the guide rod 22 enters the first guide hole 25 by being guided by the slanted coupling guide hole 27. The operation described above is repeated subsequently.

Thus, through one reciprocating motion (forward movement and backward movement) of the first conveying rod 18, the board 7 can be conveyed one process forward, i.e., to the next process. Note that the slant coupling guide hole 27 may be straight as described above or may be curved to some extent.

Figure 2:
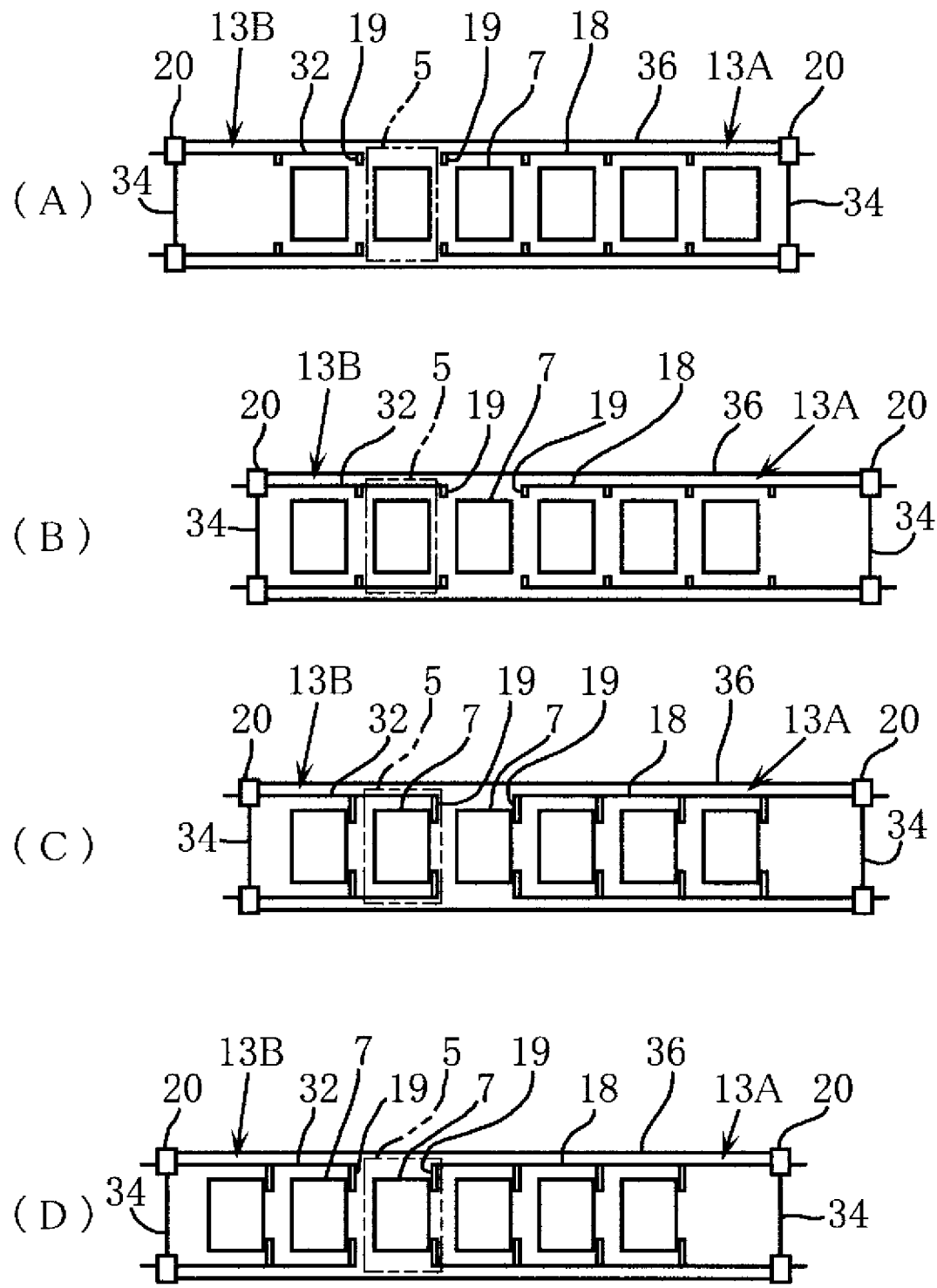
FIGS. 2(A) to 2(D) are explanatory diagrams showing operation of the conveyor apparatus.

Note that the plural pusher pieces 19 for respective ones of plural processes are fixed to the first conveying rod 18 (FIG. 2). This allows the boards 7 in respective processes to be sent to the next processes through a single forward motion of the first conveying rod 18. That is, by the first conveying rod 18, the board 7 located in front of the inlet 11 of the reflow furnace 1 is conveyed to the first preheating chamber 2A (preheating process), the board 7 located in the first preheating chamber 2A is conveyed to the next preheating chamber 2B (preheating process), the board 7 located in the preheating chamber 2B is conveyed to the reflow chamber 3A (reflow process), and the board 7 located in the reflow chamber 3A is sent to the decompression chamber 5 (decompression process).

Next, the second conveyance mechanism 13B will be described. The second conveyance mechanism 13B has a configuration similar to that of the first conveyance mechanism 13A. That is, the second conveying rod 32 (see FIG. 1) is placed horizontally, extending in the furnace 1 from immediately behind the decompression chamber 5 of the furnace 1 to a position ahead of the outlet 12 of the furnace 1. Two pusher pieces 19 are fixed to the second conveying rod 32 at a distance from each other. Each pusher piece 19 protrudes from the rod 32. As with the first conveying rod 18, the second conveying rod 32 is supported by the rod support member 20 axially rotatably, but immovably in an axial direction. The rod support member 20 is configured to be able to move horizontally by being guided by the guide groove in the support wall. Thus, the second conveying rod 32 is also configured to be able to move horizontally in the furnace 1 in a conveyance direction of the board 7 along with the rod support member 20.

Using the same switching mechanism as the one installed on the first conveying rod 18, the second conveying rod 32 is configured such that the pusher piece 19 is placed at such a position (engaged position) as to push the rear face of the board 7 on the conveyance rails 10 when the second conveying rod 32 advances (moves forward) from the side of the inlet 11 of the furnace 1 to the side of the outlet 12, and is placed at a position (retracted position) retracted to above the board 7 when the second conveying rod 32 moves backward from the side of the outlet 12 of the furnace 1 to the side of the inlet 11. Consequently, through one reciprocating motion (forward movement and backward movement) of the second conveying rod 32, the board 7 is conveyed one process forward, i.e., to the next process. Also, the plural pusher pieces 19 for respective ones of plural processes are fixed to the second conveying rod 32 as well, allowing the boards 7 in respective processes to be sent to the next processes. That is, by the second conveying rod 32, the board 7 located in the decompression chamber 5 is sent to the cooling chamber 4 (cooling process) and the board 7 located in the cooling chamber 4 is sent outside through the outlet 12 of the furnace 1.

As shown in FIG. 3, a pair of the first conveying rod 18 and switching mechanism is installed on both right and left sides of the conveyance path so as to push the right and left ends of the board 7, the first conveying rod 18 having the pusher piece 19, and upright members 33 erected on top faces of the right and left rod support members 20 are coupled by a coupling rod 34 so that the right and left first conveying rods 18 will operate together. The second conveying rod 32 is configured similarly.

Means for making the first conveying rod 18 and second conveying rod 32 reciprocate (move forward and move backward) will be described next. As shown in FIG. 1, a chain conveyor 35 is disposed outside the furnace 1 on the side of the outlet 12. The chain conveyor 35 is placed horizontally, parallel to the conveyance direction of the board 7. The rod support member 20 of the second conveying rod 32 is fixed to a chain portion of the chain conveyor 35. The rod support member 20 of the first conveying rod 18 and rod support member 20 of the second conveying rod 32 are coupled via a coupling rod 36. The coupling rod 36 penetrates the furnace 1 and is placed outside the decompression chamber 5.

The first conveying rod 18 and second conveying rod 32 move a predetermined distance (equivalent to one process) forward when the chain conveyor 35 rotates a predetermined angle forward in the direction of arrow A in FIG. 4, and move a predetermined distance (equivalent to one process) backward when the chain conveyor 35 rotates a predetermined angle backward in the direction of arrow B in FIG. 4. In this way, as the chain conveyor 35 rotates a predetermined angle forward and backward, the first conveying rod 18 and second conveying rod 32 is reciprocated a predetermined distance (equivalent to one process).

Operation of the conveyor apparatus 13 will be described below with reference to FIG. 2. FIG. 2(A) shows how the board 7 is placed in each process and processed there for a predetermined period of time. FIGS. 2(B) to 2(D) show how the board 7 is transferred to the next process after being processed in the state of FIG. 2(A) for the predetermined period of time.

In FIG. 2(C), the first conveying rod 18 and second conveying rod 32 are in states described below. That is, the pusher pieces 19 of the first conveying rod 18 are at the engaged position, being located on the upstream side of the respective boards 7 located in the reflow chamber 3A (reflow process), in the preheating chamber 2B (preheating process), in the preheating chamber 2A (preheating process), and in front of the furnace 1 inlet, respectively. The pusher pieces 19 of the second conveying rod 32 are at the engaged position, being located on the upstream side of the respective boards 7 in the decompression chamber 5 (decompression process) and cooling chamber 4 (cooling process), respectively.

As the first conveying rod 18 and second conveying rod 32 move forward after the state of FIG. 2(C), with the guide rod 22 being guided by the first guide hole 25 as a result of forward rotation of the chain conveyor 35, the board 7 in each process is sent to the next step by the pusher piece 19 as shown in FIGS. 2(C) to 2(D).

That is, by the first conveying rod 18, the board 7 located in front of the inlet 11 of the furnace 1 is conveyed to the first preheating chamber 2A (preheating process), the board 7 located in the first preheating chamber 2A is conveyed to the next preheating chamber 2B (preheating process), the board 7 located in the preheating chamber 2B is conveyed to the reflow chamber 3A (reflow process), and the board 7 located in the reflow chamber 3A is sent to the decompression chamber 5 (decompression process). Also, by the second conveying rod 32, the board 7 located in the decompression chamber 5 is sent to the cooling chamber 4 (cooling process) and the board 7 located in the cooling chamber 4 is sent outside through the outlet 12 of the furnace 1.

Next, as a result of backward rotation of the chain conveyor 35, the first conveying rod 18 and second conveying rod 32 are transferred from the state of FIG. 2(D) to the state of FIG. 2(A). That is, as the first conveying rod 18 and second conveying rod 32 move backward, the guide rod 22 enters the second guide hole 26 by being guided by the coupling guide hole 27 and the pusher pieces 19 are placed at the retracted position.

In FIG. 2(A), the first conveying rod 18 and second conveying rod 32 are in states described below. That is, the first conveying rod 18 and second conveying rod 32 are placed outside the decompression chamber 5, the pusher pieces 19 are at the retracted position, and the pusher pieces 19 at the heads of the rods 18 and 32 are placed on opposite sides of the decompression chamber 5. In this state, the boards 7 are processed in respective processes for a predetermined period of time.

After the boards 7 are processed in respective processes in the state of FIG. 2(A) for the predetermined period of time, the first conveying rod 18 and second conveying rod 32 move backward as a result of backward rotation of the chain conveyor 35, shifting from the state of FIG. 2(A) to the state of FIG. 2(B). That is, with the guide rods 22 being guided by the second guide holes 26 and with the pusher pieces 19 being placed at the retracted position, the first conveying rod 18 and second conveying rod 32 move backward by approximately one process.

In FIG. 2(B), the first conveying rod 18 and second conveying rod 32 are in states described below. That is, the pusher pieces 19 of the first conveying rod 18 are at the retracted position, being located on the upstream side of the respective boards 7 located in the reflow chamber 3A (reflow process), in the preheating chamber 2B (preheating process), in the preheating chamber 2A (preheating process), and in front of the furnace 1 inlet, respectively. The pusher pieces 19 of the second conveying rod 32 are at the retracted position, being positioned on the upstream side (rear end) of the respective boards 7 located in the decompression chamber 5 (decompression process) and cooling chamber 4 (cooling process).

Next, as a result of forward rotation of the chain conveyor 35, the first conveying rod 18 and second conveying rod 32 are transferred from the state of FIG. 2(B) to the state of FIG. 2(C). That is, as the first conveying rod 18 and second conveying rod 32 move forward, the guide rod 22 enters the first guide hole 25 by being guided by the coupling guide hole 27, the pusher pieces 19 are placed at the engaged position, transferring the first conveying rod 18 and second conveying rod 32 to the state of FIG. 2(C). Subsequently, the above-described operation is repeated, beginning with the state of FIG. 2(C) described above.

In this way, through one reciprocating motion (forward movement and backward movement) of the first conveying rod 18 and second conveying rod 32, the boards 7 are sent to next processes, respectively, and processed in respective processes for a predetermined period of time.

Regarding the decompression process, the board 7 can be carried into the decompression process by the first conveyance mechanism 13A and carried out of the decompression process by the second conveyance mechanism 13B.

Therefore, the printed circuit board 7 on which electronic components have been mounted via cream solder is conveyed from a position in front of the inlet 11 of the furnace 1 by the conveyor apparatus 13 going through processes one by one including the decompression process in the reflow furnace 1, and processed in each process for a predetermined period of time. Consequently, the board 7 on which the electronic components have been soldered is carried out of the furnace 1 through the outlet 12 of the furnace 1.

Note that the operations of the first conveying rod 18 and second conveying rod 32 are performed by controlling a driving motor of the chain conveyor 35 according to a predetermined sequence.

Figure 6:
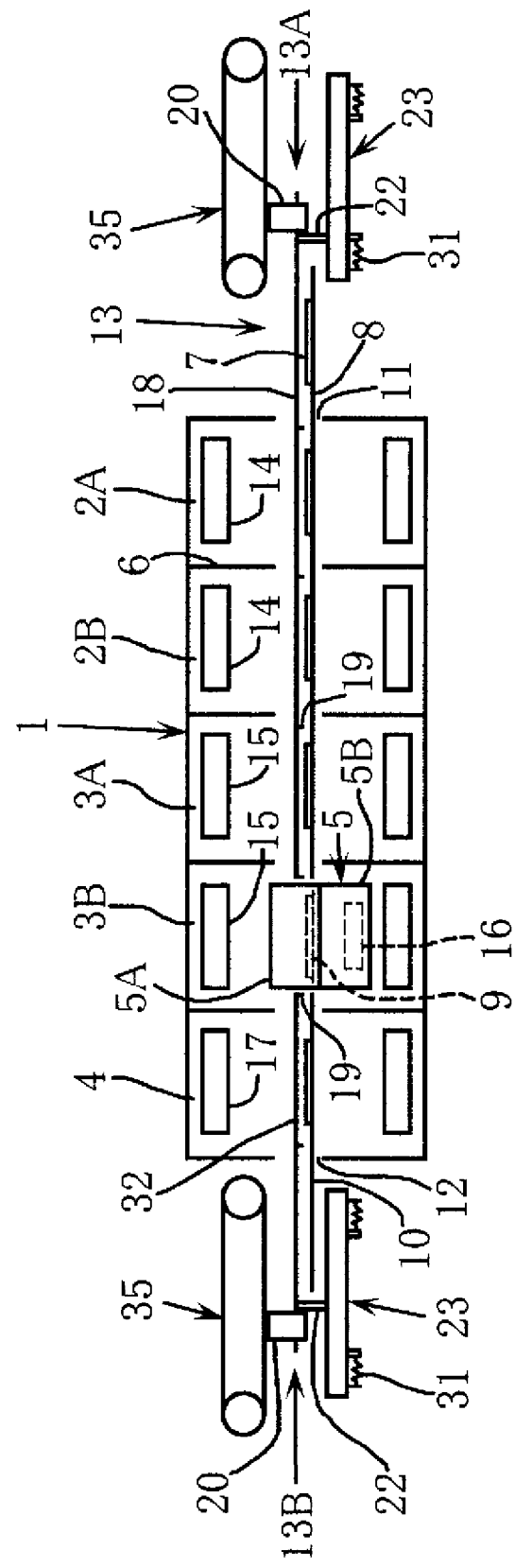
FIG. 6 is an overall configuration diagram of a reflow soldering apparatus equipped with a modification of a drive system for first and second conveying rods.

The first conveying rod 18 and second conveying rod 32 may be driven by respective chain conveyors independent of each other. That is, although the first conveying rod 18 and second conveying rod 32 are driven by the common chain conveyor 35 in the above embodiment, two chain conveyors 35 may be installed to drive the first conveying rod 18 and second conveying rod 32 separately as a modification (FIG. 6). According to this modification, the first conveying rod 18 and second conveying rod 32 are driven independently by separate chain conveyors 35, 35.

That is, as shown in FIG. 6, the rod support members 20 of the first conveying rod 18 and second conveying rod 32 are separated instead of being coupled via a coupling rod and the chain conveyor 35 adapted to drive the first conveying rod 18 is installed on the inlet side of the furnace 1 while the chain conveyor 35 adapted to drive the second conveying rod 32 is installed on the outlet side of the furnace 1. The first conveying rod 18 and second conveying rod 32 are coupled to the respective chain conveyors 35 via the respective rod support members 20, which are fixed to the chain portions of the respective chain conveyors 35, as with the above embodiment. The operations of the first conveying rod 18 and second conveying rod 32 are the same as those described with reference to FIGS. 2(A) to 2(D).

Although an example of guiding the guide rod 22 using the guide hole 24 has been described in the above embodiment, this is not restrictive, and the guide rod 22 may be configured to be guided, for example, by a guide groove.

Although in the above embodiment, the first conveyance mechanism 13A has a pair of the first conveying rods 18 and the second conveyance mechanism 13B has a pair of second conveying rods 32, each of the conveyance mechanisms may be configured to have a single conveying rod.

Although the common chain conveyor 35 is used in the above embodiment as driving means adapted to reciprocate the first conveying rod 18 and second conveying rod 32, this is not restrictive, and a belt conveyor or the like may be used alternatively. Of course, the first and second conveying rods 18 and 32 may be driven by separate belt conveyors.

Although an example in which the decompression chamber is installed in the reflow chamber has been described in the above embodiment, the decompression chamber may be installed independently of the reflow chamber, or installed on the board conveyance path.

Also, although nitrogen gas is used as a furnace gas in the above embodiment, the gas is not limited to nitrogen gas. For example air may be used.

What is claimed is:

1. A conveyor comprising:
   a conveying rod adapted to reciprocate along a conveyance path along which a workpiece is conveyed;
   a pusher member fixed to the conveying rod and configured to protrude from the conveying rod; and
   a switching mechanism adapted to switch the pusher member, by turning the conveying rod a predetermined angle, between an engaged position where the pusher member engages with the workpiece and a retracted position where the pusher member is separated from the workpiece,
   wherein the switching mechanism includes a guide member related to the conveying rod;
   the conveying rod includes a guided portion protruding from the conveying rod;
   the guide member includes a guiding portion adapted to guide the guided portion of the conveying rod;
   the guiding portion is configured to guide the guided portion into a closed loop using first and second guiding portions configured to extend in parallel to each other along the conveyance path and first and second coupling guide portions configured to couple ends of the first and second guiding portions to each other;
   the guide member is configured such that the guided portion makes a round of a guiding portion of the closed loop of the guide member through one reciprocating motion of the conveying rod;
   the pusher member of the conveying rod assumes the engaged position when the guided portion of the conveying rod moves forward by being guided by the first guiding portion; and
   the pusher member of the conveying rod assumes the retracted position when the guided portion of the conveying rod moves backward by being guided by the second guiding portion.

2. The conveyor apparatus according to claim 1, wherein the guiding portion of the closed loop and the guided portion of the conveying rod make up a cam mechanism adapted to switch the pusher member between the engaged position and the retracted position.

3. The conveyor apparatus according to claim 2, wherein the guiding portion of the closed loop is made up of a guide hole or a guide groove.

4. The conveyor apparatus according to claim 3, wherein:
   one end of the first guiding portion is coupled to one end of the first coupling guide portion;
   another end of the first coupling guide portion is coupled to one end of the second guiding portion;
   another end of the second guiding portion is coupled to one end of the second coupling guide portion; and
   another end of the second coupling guide portion is coupled to another end of the first guiding portion.

5. The conveyor apparatus according to claim 4, wherein:
   a first blocking piece is placed in a portion where the one end of the first guiding portion and the one end of the first coupling guide portion are joined together;
   a second blocking piece is placed in a portion where the other end of the second guiding portion and the one end of the second coupling guide portion are joined together;
   the first blocking piece has a function to permit the guided portion to move forward to the one end of the first guiding portion by being guided by the first guiding portion and a function to lead the guided portion to the first coupling guide portion when the guided portion moves backward from the one end of the first guiding portion; and
   the second blocking piece has a function to permit the guided portion to move backward to the other end of the second guiding portion by being guided by the second guiding portion and a function to lead the guided portion to the second coupling guide portion when the guided portion moves forward from a rear end of the second guiding portion.

6. The conveyor apparatus according to claim 1, wherein the conveyance path is a board conveyance path of a reflow furnace.

* * * * *